2,735,841
SULFINIC ACIDS OF POLYMERS CONTAINING AROMATIC GROUPS

Charles F. H. Allen and Louis M. Minsk, Rochester, N. Y., assignors to Eastman Kodak Company, Rochester, N. Y., a corporation of New Jersey No Drawing. Application July 29, 1952, Serial No. 301,607

11 Claims. (Cl. 260—79.3)

This invention relates to resinous polymers containing aromatic groups having sulfinic acid groups attached to nuclear carbon atoms, and more particularly to linear polyvinyl resins containing arylsulfinic acid sidechains, and to a process for their preparation.

Water-soluble polystyrenes have been prepared heretofore by reacting polystyrenes with various sulfonating agents such as sulfur trioxide, fuming sulfuric acid, chlorosulfonic acid, and the like. Such sulfonated polystyrenes in the form of the free acids or alkali metal salts thereof have had extensive commercial uses as sizing agents, adhesives, dispersing agents, etc. We have now found that resinous polymers containing aromatic groups such as, for example, polystyrene and copolymers of styrene, can be sulfinated under certain conditions to give resinous products containing nuclear substituted —$SO_2H$ groups and that such products are insoluble in water, but readily soluble in aqueous alkaline solutions. Our new class of sulfonated resins are useful as gelatin coagulants, as antistatic agents for materials such as photographic materials, as well as being valuable intermediates for the preparation of useful derivatives. They have reducing properties and are capable under certain conditions of cross-linking between polymeric chains.

It is, accordingly, an object of the invention to provide a new class of resinous polymers containing aromatic groups having sulfinic acid groups attached to nuclear carbon atoms. Another object is to provide sulfinated polystyrenes. Another object is to provide a process for preparing such resinous polymers. Other objects will become apparent hereinafter.

In accordance with our invention, we prepare sulfiniated products comprising the recurring structural unit

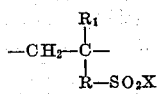

wherein R represents an aromatic nucleus such as a benzene nucleus or a naphthalene nucleus, $R_1$ represents an atom of hydrogen or a methyl group, and X represents an atom of hydrogen or an alkali-metal atom, by reacting a resinous polymer containing aromatic groups (e. g., polystyrene, poly-α-methylstyrene, polyvinyl naphthalene, etc.) with dry sulfur dioxide, in an anhydrous solvent medium such as carbon disulfide, in the presence of a Friedel-Crafts type of catalyst, preferably anhydrous aluminum chloride, at a temperature of from —10° to 25° C., until the sulfination reaction is substantially complete, and then treating the precipitated metal complex with a strong mineral acid to obtain the free sulfinic acid derivative. Advantageously, dry hydrogen chloride is passed through the reaction mixture prior to the admission of the sulfur dioxide. The salts of the acid derivative can be prepared by treating the acid with an alkaline solution such as aqueous sodium hydroxide, potassium hydroxide, etc. Advantageously, the sulfination reaction is carried out with vigorous agitation while maintaining anhydrous conditions. The insoluble aluminum complex that forms can then be converted to the free acid by treatment with strong mineral acid such as aqueous hydrochloric acid, sulfuric acid, etc. The water-insoluble free acid can be converted to water-soluble alkali metal salts by treatment with aqueous alkalies (e. g., aqueous sodium or potassium hydroxides, etc.). Evidence indicates that complete sulfination is obtained when one sulfinic group is attached to each aromatic group of the polymer. In the case of polystyrenes, the sulfino group enters the para-position of the benzene nucleus, whenever this position is unsubstituted. Where the para-position is substituted with, for example, a methyl group, the sulfino group enters one of the other unsubstituted positions. In general, the new sulfinated polymers of the invention contain from 55 to 90 percent by weight of the sulfinated aromatic group, the remainder of the polymer being unreacted units of the original polymer. For example, sulfinated polystyrenes of the invention contain from 55 to 90 parts by weight of combined vinylbenzene sulfinic acid, the remainder being styrene.

The following example will serve to illustrate further our new resinous polymers containing nuclear sulfinated aromatic groups, and the manner of their preparation.

Example 10 g. of polystyrene were dispersed with stirring in 400 cc. of carbon disulfide in an apparatus equipped with a gas inlet extending below the surface of the liquid, a mechanical stirrer and a condenser provided with a calcium chloride tube to exclude moisture. The reaction mixture was cooled and maintained cold in a bath of ice and salt. 20 g. of anhydrous aluminum chloride were added. Vigorous mechanical stirring was maintained while a stream of dry hydrogen chloride was passed through the reaction mixture for 5 minutes, followed by a stream of dry sulfur dioxide over a period of 3 hours. With the sulfur dioxide admission, the reaction mixture gelled, but with the vigorous stirring the gel disintegrated to yield ultimately a brown slurry. The precipitate was filtered onto a Buchner funnel, washed with about 600 cc. of fresh carbon disulfide and dried in an air stream until the retained carbon disulfide was removed. The granular product was in the form of an aluminum complex. It was suspended in one liter of a mixture of ice and distilled water, and made strongly acid with concentrated hydrochloric acid. The resultant product was filtered onto a Buchner funnel and washed with water until free from chloride ion. 44 g. of the moist product was obtained. 10 g. of the above product were dried in a vacuum desiccator over calcium chloride under constant water pump vacuum to yield 3 g. of the dried free acid which was found by analysis to contain approximately 80 percent by weight of the recurring structural unit

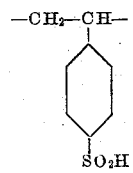

34 g. of the above moist product were suspended in 100 cc. of distilled water and 40 percent aqueous sodium hydroxide was added slowly with vigorous mechanical stirring. A smooth, viscous dope was obtained, whose weight was adjusted to 150 g. by further addition of distilled water. Then 75 g. of this dope were poured in a fine stream into 4 liters of absolute ethyl alcohol. The sodium salt of the polystyrene-p-sulfinic acid product precipitated as a white fibrous solid, which hardened on extraction with fresh ethyl alcohol. A yield of 6.5 g. of the salt was obtained. It was an excellent coagulant of gelatin and was also useful as an antistatic agent for photographic materials.

In place of polystyrene in the above example, there can be substituted other polyvinyl resins containing aryl nuclei such as, for example, poly-α-methylstyrene to give the corresponding polyisopropenylbenzene p-sulfinic acid and salts thereof; polyvinyl naphthalene to give the corresponding polymeric products comprising a major proportion by weight of polyvinylnaphthalene-α-sulfinic acid; polyvinyl toluenes to give the various polymeric products comprising a major proportion of polyvinyl toluene-sulfinic acids and salts thereof, etc. Other resinous aromatic compounds which can also be employed in the process of the invention for preparing corresponding sulfinic acid derivatives include phenol-formaldehyde resins, poly-dihydronaphthalenes, coumarone-indene resins, and the like. All of the mentioned resins of the invention have generally similar properties and uses. They are all water-insoluble, but readily soluble in aqueous alkaline solutions such as in aqueous alkali-metal hydroxides.

What we claim is:

1. A process for preparing a sulfinated polymer containing from 55 to 90 per cent by weight of a structural unit selected from those represented by the following general structural unit

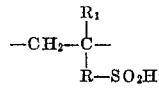

wherein R represents an aromatic nucleus selected from the group consisting of a benzene nucleus and a naphthalene nucleus and R₁ represents a member selected from the group consisting of a hydrogen and methyl group, comprising reacting a polymer selected from the group consisting of polystyrene, poly-α-methylstyrene and polyvinylnaphthalene with sulfur dioxide, under anhydrous conditions and in the presence of a Friedel-Crafts type catalyst, at a temperature of from −10° to 25° C., and treating the resultant product with a strong mineral acid.

2. A process for preparing a sulfinated polystyrene containing from 55 to 90 per cent by weight of a combined vinylbenzene sulfinic acid comprising reacting a polystyrene with dry sulfur dioxide under anhydrous conditions and in the presence of anhydrous aluminum chloride, at a temperature of from −10° to 25° C., and treating the resultant product with concentrated hydrochloric acid.

3. A process for preparing a sulfinated polystyrene containing from 55 to 90 per cent by weight of combined vinylbenzene-p-sulfinic acid comprising reacting polystyrene with dry sulfur dioxide under anhydrous conditions and in the presence of anhydrous aluminum chloride, at a temperature of from −10° to 25° C., and treating the resultant product with concentrated hydrochloric acid.

4. A process for preparing a sulfinated polyvinylnaphthalene containing from 55 to 90 per cent by weight of a combined vinylnaphthalene sulfinic acid comprising reacting a polyvinylnaphthalene with dry sulfur dioxide under anhydrous conditions and in the presence of anhydrous aluminum chloride, at a temperature of from −10° to 25° C., and treating the resultant product with concentrated hydrochloric acid.

5. A process for preparing a sulfinated polyvinyltoluene containing from 55 to 90 percent by weight of vinyltoluene sulfinic acid comprising reacting a polyvinyltoluene with dry sulfur dioxide under anhydrous conditions and in the presence of anhydrous aluminum chloride, at a temperature of from −10° to 25° C., and treating the resultant product with concentrated hydrochloric acid.

6. A nuclear sulfinated polymer selected from the group consisting of a nuclear sulfinated polystyrene, a nuclear sulfinated poly-α-methylstyrene and a nuclear sulfinated polyvinylnaphthalene, wherein each molecule of the said nuclear sulfinated polymer consists of from 55 to 90 per cent by weight of sulfinated units having the general structure:

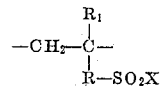

wherein R represents an aromatic nucleus selected from the group consisting of a benzene nucleus and a naphthalene nucleus, R₁ represents a member selected from the group consisting of a hydrogen atom and a methyl group and X represents a member selected from the group consisting of a hydrogen atom and an alkali metal atom, and from 45 to 10 per cent by weight of nonsulfinated units.

7. A nuclear sulfinated polystyrene wherein each molecule consists of from 55 to 90 per cent by weight of vinylbenzene monosulfinic acid units and from 45 to 10 per cent by weight of styrene units.

8. A nuclear sulfinated polystyrene wherein each molecule consists of from 55 to 90 percent by weight of vinylbenzene-p-sulfinic acid units and from 45 to 10 per cent by weight of styrene units.

9. The sodium salt of a nuclear sulfinated polystyrene wherein each molecule consists of from 55 to 90 per cent by weight of vinylbenzene-p-sulfinic acid units and from 45 to 10 per cent by weight of styrene units.

10. A nuclear sulfinated poly-α-methylstyrene wherein each molecule consists of from 55 to 90 per cent by weight of α-methylstyrene monosulfinic acid units and from 45 to 10 per cent by weight of α-methylstyrene units.

11. A nuclear sulfinated polyvinyl naphthalene wherein each molecule consists of from 55 to 90 per cent by weight of vinylnaphthalene monosulfinic acid units and from 45 to 10 per cent by weight of vinylnaphthalene units.

References Cited in the file of this patent

UNITED STATES PATENTS

| 2,031,929 | Breuers | Feb. 25, 1936 |
| 2,469,847 | Rumscheidt | May 10, 1949 |
| 2,572,185 | Noether | Oct. 23, 1951 |

FOREIGN PATENTS

| 903,226 | France | Jan. 8, 1945 |

OTHER REFERENCES

Bachman et al.: J. Am. Chem. Soc., 73, 2857–8, June 1951.

Yanes et al.: Anales Real. Soc. Espan. fis y quim, 46B, 679–80 (1950), abstracted in C. A. 45, 6168 (1951).